Figure 1:
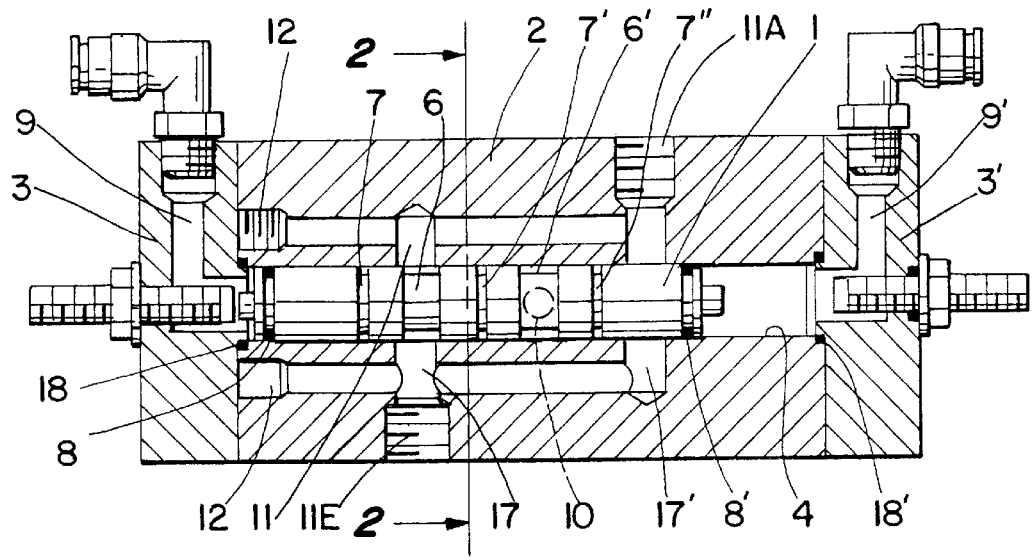

United States Patent [19]
Emmerich et al.

[11] Patent Number: 5,829,633
[45] Date of Patent: Nov. 3, 1998

[54] METHOD AND APPARATUS FOR METERING LIQUIDS

[75] Inventors: Rüdiger Emmerich, Grevenbroich; Jörg Berger, Aachen, both of Germany

[73] Assignee: PKL Verpackungssysteme GmbH, Germany

[21] Appl. No.: 600,271

[22] Filed: Feb. 9, 1996

[30] Foreign Application Priority Data

Feb. 11, 1995 [DE] Germany ................. 195 04 556.4

[51] Int. Cl.⁶ .................................................. B67B 7/00
[52] U.S. Cl. ................................................ 222/1; 222/249
[58] Field of Search ................................. 222/249, 250, 222/365, 1

[56] References Cited

U.S. PATENT DOCUMENTS

| | | | |
|---|---|---|---|
| 3,737,073 | 6/1973 | Lupert | 222/250 X |
| 4,162,750 | 7/1979 | Demers et al. | 222/250 |
| 4,705,034 | 11/1987 | Perkins | 222/250 X |
| 4,736,873 | 4/1988 | Patriquin | 222/249 |
| 5,092,494 | 3/1992 | Proglyada | 222/250 |

*Primary Examiner*—Gregory L. Huson
*Attorney, Agent, or Firm*—Standley & Gilcrest

[57] ABSTRACT

The invention relates to an apparatus and a method for the metering of a predeterminable quantity of a liquid, more particularly $H_2O_2$, having a liquid inlet (10E), at least one metering chamber (6) and a liquid outlet (10A), in that the quantity of the liquid delivered by the apparatus always has not only an identical volume, but also identical properties. Thus more particularly in the case of gassing-out liquids, such as $H_2O_2$, for example, it is possible to reliably ensure that a continues metering of a bubble-free liquid is rendered possible, so as not to change the concentration. This problem is solved in the apparatus according to the invention by the features that in addition to the liquid line (10) between the liquid inlet (10E) and the liquid outlet (10A), a compressed air line (11) is provided between a compressed air inlet (11E) and a compressed air outlet (11A), and at least one metering chamber can be alternately connected to the liquid line (10) and the compressed air line (11). As regard the method, the problem is solved by the following steps:

The filling of at least one metering chamber (6) with a liquid, the closure of the filled metering chamber(s) (6, 6') by changing the position of the movable element (1), and the discharge of the metered quantity of liquid.

9 Claims, 1 Drawing Sheet

METHOD AND APPARATUS FOR METERING LIQUIDS

The invention relates to an apparatus and a method for the metering of a predeterminable quantity of a liquid, more particularly $H_2O_2$, having a liquid inlet, at least one metering chamber and a liquid outlet.

It is known to sterilize packagings intended for the reception of foodstuffs prior to their filling with the particular contents. To this end the interior of the packaging is sprayed with a suitable quantity of a sterilizing agent, such as $H_2O_2$, to reliably exterminate any germs present in the packaging. The minimum quantity of $H_2O_2$ required is determined in accordance with the volume of the packaging to be filled.

DE-PS 27 08 422 discloses a device for the pulsed delivery of a small quantity of liquid, the quantities of liquid being controllable by means of a measuring apparatus. The measuring apparatus has a measuring vessel which can be filled with a fairly large quantity of liquid and whose outlet is connected to an ejection member for the small quantities of liquid, the measuring vessel having a sensing device which comprises an upper and a lower feeler and which controls a pump for the refilling of the measuring vessel from a storage container via a supply line. By means of the pump a predetermined filling volume is supplied to the measuring vessel, to ensure that the required quantity of liquid is removed continuously. The measuring vessel is refilled by means of the pump only when the contents of the measuring vessel fail to reach a predetermined quantity.

It is true that with the known apparatus it was possible to meter a predeterminable quantity of $H_2O_2$, but it was found that due to the decreasing contents of the measuring vessel during removal, the $H_2O_2$ contained therein gassed out, the result being a change in volume. Due to the gas bubbles contained in the $H_2O_2$, the actual quantity of metered $H_2O_2$ became smaller with each metering operation, so that in spite of identical volumetric metering, a lower concentration was set up. However, to enable the required bacteriacidal effect to be reliably ensured during sterilization, it is undesirable to change the concentration of the $H_2O_2$ use, since sterilization cannot be adequate unless a minimum concentration is reached.

Starting from this point, the invention relates to the problem of so designing and further developing the aforementioned apparatus described in greater detail hereinbefore and the corresponding method for metering a predeterminable quantity of a liquid that the quantity of the liquid delivered by the apparatus always has not only an identical volume, but also identical properties. Thus more particularly in the case of gassing-out liquids, such as $H_2O_2$, for example, it is possible to reliably ensure that a continuous metering of a bubble-free liquid is rendered possible, so as not to change the concentration.

In the apparatus according to the invention this problem is solved by the features that in addition to the liquid line between the liquid inlet and the liquid outlet, a compressed air line is provided between a compressed air inlet and a compressed air outlet, and at least one metering chamber can be alternately connected to the liquid line and the compressed air line.

As regards the method, the problem is solved by the following steps:
  the filling of at least one metering chamber with a liquid,
  the closure of the filled metering chamber(s) by changing the position of the movable element, and
  the discharge of the metered quantity of liquid.

According to a further feature of the invention at least two metering chambers are so disposed in a movable element that the metering chambers are connected alternately to the liquid line and the compressed air line. This feature enables a uniform volumetric flow to be produced by the alternate metering of two metering chambers. The fact that the particular metering chamber flushed by the liquid line receives a bubble-free quantity of the liquid corresponding to its size means that metering is performed with high accuracy and the aforedescribed disadvantages of the prior art as regards the gassing-out of sensitive liquids is reliably precluded.

According to one convenient further feature of the invention the movable element takes the form of a piston linearly slidable in a cylinder, and two metering chambers are provided which are formed by circularly extending grooves with which the piston is formed. Such a design of the apparatus according to the invention is simple in construction, little subject to wear and highly reliable, since according to another idea of the invention in each end position of the piston, one metering chamber is connected to the liquid line, the other metering chamber being connected to the compressed air line. However, a rotary or pivoting element containing the metering chambers might also be provided as the movable element.

A cylinder is used for guiding the piston; the cylinder has a principal member and two end plates, and lines for pressurizing the piston are disposed in the end plates. Since the piston has two defined end positions, the metering chambers are reliably precisely positioned in front of the particular liquid inlet or outlet opening at low technical expense.

Particularly conveniently the piston is sealed at its ends in the direction of the cylinder with seals and is formed with circularly extending grooves on both sides of the metering chambers as a leakage line.

According to another feature of the invention, the high reliability of the apparatus according to the invention is further enhanced by the feature that the particular end position of the piston can be detected by a sensor. This feature reliably ensures that the position of the metering chambers is always precisely aligned with the position of the liquid or compressed air lines.

In the case of the method a particularly advantageous effect is achieved if the discharge of the metered quantity of liquid, the entire metering chamber is acted upon by compressed air, so that simultaneously the liquid is atomized to give an aerosol. This is particularly advantageous for application to the sterilization of packagings intended for foodstuffs, since as a result it is impossible for larger $H_2O_2$ droplets to occur inside the packagings which might not be removable by a subsequent flushing operation.

Figure 2:
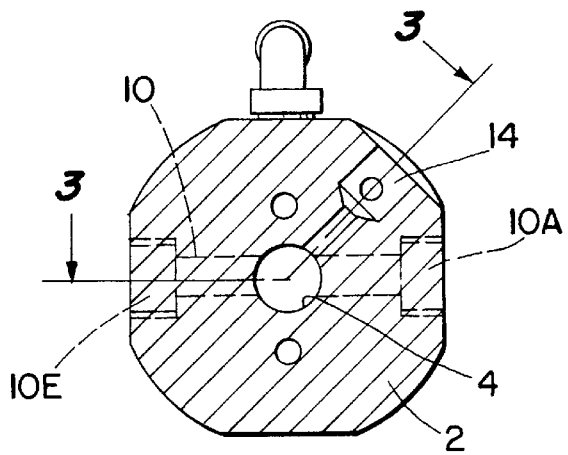
Figure 3:
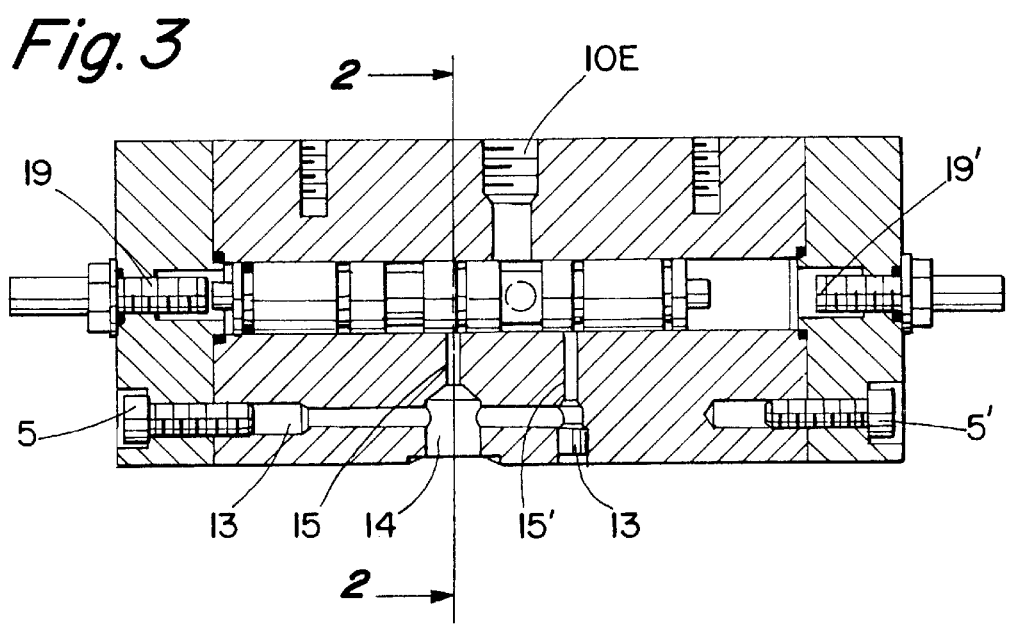

A preferred embodiment of the invention will now be described in greater detail. The drawings show:

FIG. 1 a longitudinal section through an apparatus according to the invention,

FIG. 2 the apparatus according to the invention illustrated in FIG. 1, in cross-section along the line II—II in FIGS. 1 and 3, and FIG. 3 the apparatus according to the invention sectioned along the line III—III in FIG. 2.

The embodiment of the apparatus illustrated and therefore more particularly preferred has in the first place a piston 1 which is floatably guided in a cylinder 4 consisting of a principal member 2 and end plates 3 and 3'. The principal member 2 and the end plates 3; 3' are connected via screws 5, 5', as shown in FIG. 3. To make the drawing clearer, those parts of the construction having references in FIG. 1 are shown without references in FIG. 3.

In the embodiment illustrated the piston 1 has two metering chambers 6 and 6'. Circularly extending grooves 7, 7', 7" are provided as leakage accumulators on both sides of the metering chambers 6, 6'. FIGS. 1 and 3 show clearly that the piston 1 also has at its ends further circularly extending grooves (not shown in detail) on which seals 8, 8' are disposed to prevent the liquid to be metered from penetrating into the space of the cylinder.

The piston is controlled from one end position into the other by means of compressed air supplied alternately via control lines 9 and 9'. Connecting spigots (not shown in detail) are inserted in the corresponding outlets of the control lines (9, 9'), as can be gathered more particularly from FIGS. 1 and 2.

In one end position of the piston 1 the liquid to be metered passes via a liquid inlet 10E' into the metering chamber 6', as clearly shown in FIG. 3. Since FIG. 3 is a section in a bent plane, the liquid outlet 10A cannot be seen in FIG. 3. For this reason the liquid line 10 extending through the cylinder 4 is again shown in chain lines in FIG. 2. An essential element of the invention is therefore the realization that the metering chamber is moved into a flow of liquid guided via the liquid line 10. At the same time the annular space of the metering chamber 6' is completely filled.

Since the piston 1 is in the same position in FIGS. 1 and 3, in both drawings the second metering chamber 6 is connected to a compressed air line 11 in the principal member 2 during the filling of the first metering chamber 6', as clearly shown in FIG. 1. The compressed air lines 11 provided in the principal member are bores which are suitably adapted to one another and whose ends are closed by suitable plugs 12, so that there is only ever one single compressed air inlet 11E and compressed air outlet 11A. In this way propellant air blown into the compressed air inlet 11E can not only completely empty the metering chamber, but moreover produce an aerosol mixture as early as during the metering.

As shown in FIG. 1, when metering chamber 6' is connected to the liquid line 10, metering chamber 6 is connected to compressed air line 11. The compressed air flows from the compressed air inlet 11A through the upper air line and then through metering chamber 6 to compressed air outlet 11E. When the piston is moved to the second position, metering chamber 6 is connected to liquid line 10 and metering chamber 6' is connected to compressed air line 11. In this arrangement, the compressed air flows from the compressed air inlet 11A through metering chamber 6' and through the lower air line to compressed air outlet 11E.

As already mentioned, during the filling of the metering chambers 6, 6' portions of the liquid may also get into the annular gaps of the grooves 7, 7' and 7". The annular grooves 7, 7' or 7', 7" adjacent to the particular metering chamber 6 or 6' to be filled are at the same time connected via corresponding leakage lines 15, 15' to a leakage outlet 14, as shown in FIGS. 2 and 3. The liquid emerging from the leakage outlet 14 can be intercepted and reused. The leakage lines 15, 15' produced by bores can also be closed with plugs 13 and are connected to only one single leakage outlet 14.

It is self-evident that with a high enough stroke rate of the piston 1 and/or with a suitable arrangement of metering chambers 6, 6' and liquid line 10 and compressed air line 11, it is possible to adjust a substantially continuous aerosol flow with a constant volumetric flow.

To prevent the control air guided via the control lines 9, 9' from escaping in the gap between the principal member 2 and the end plates 3, 3', seals 18, 18' are disposed in the end zones of the cylinder 4. In the embodiment illustrated and therefore preferred, sensors 19, 19' inserted into the control lines 9, 9' also enable the precise particular end position of the piston to be detected. The sensors used can be, for example, commercially available proximity switches.

We claim:

1. A method of metering a predeterminable quantity of a liquid using a device comprising a liquid inlet, a liquid outlet, a liquid line connecting the liquid inlet and the liquid outlet, a compressed air inlet, a compressed air outlet, a compressed air line connecting the compressed air inlet and the compressed air outlet, and at least one metering chamber movable between a first position connected to the liquid line and a second position connected to the compressed air line, the method comprising:

filling the at least one metering chamber with the predetermined quantity of liquid;

closing the at least one metering chamber by moving the at least one metering chamber between the first position and the second position; and discharging the predetermined quantity of the liquid.

2. A method according to claim 1, characterized in that the discharge of the metered quantity of liquid, the entire metering chamber is acted upon by compressed air, so that simultaneously the liquid is atomized to give an aerosol.

3. An apparatus for the metering of a predetermined quantity of a liquid comprising: a liquid inlet;

a liquid outlet;

a liquid line connecting the liquid inlet and the liquid outlet;

a compressed air inlet;

a compressed air outlet;

a compressed air line connecting the compressed air inlet and the compressed air outlet; and at least one metering chamber movable between a first position connected to the liquid line wherein the at least one metering chamber is filled with the predetermined quantity of the liquid and a second position connected to the compressed air line wherein the predetermined quantity of the liquid is discharged from the at least one metering chamber.

4. An apparatus according to claim 3 having a first and a second metering chamber, the first and second metering chambers being disposed in a movable element such that when the first metering chamber is connected to the liquid line, the second metering chamber is connected to the compressed air line, and when the first metering chamber is connected to the compressed air line, the second metering chamber is connected to the liquid line.

5. An apparatus according to claim 3, characterized in that the movable element is a piston linearly slidable in a cylinder, and the first and second metering chambers are formed by circularly extending grooves in the piston.

6. An apparatus according to claim 5, characterized in that in each end position of the piston, one metering chamber is connected to the liquid line, the other metering chamber being connected to the compressed air line.

7. An apparatus according to claim 5, characterized in that the piston is sealed off at its ends from the cylinder by seals and is formed on both sides of the first and second metering chambers with circularly extending grooves as a leakage line.

8. An apparatus according to claim 5, characterized in that the end position of the piston is detected by a sensor.

9. An apparatus according to claim 5 or 6, characterized in that the cylinder has a principal member and two end plates, and lines for pressuring the piston are disposed in the end plates.

* * * * *

UNITED STATES PATENT AND TRADEMARK OFFICE
CERTIFICATE OF CORRECTION

PATENT NO. : 5,829,633
DATED : Novenber 3, 1998
INVENTOR(S) : Rüdiger Emmerich, and Jörg Berger It is certified that error appears in the above-identified patent and that said Letters Patent is hereby corrected as shown below:

In column 2, line 45, after the word "if," please insert -- during --.

In column 4, line 19, after the word "that," please insert -- during --.

In column 4, line 47, please delete the number "3" and replace it with -- 4 --.

Signed and Sealed this

Fourth Day of May, 1999

*Attest:*

Q. TODD DICKINSON

*Attesting Officer*      Acting Commissioner of Patents and Trademarks